US012681189B2

(12) United States Patent
Carlson et al.

(10) Patent No.: US 12,681,189 B2
(45) Date of Patent: Jul. 14, 2026

(54) SYSTEMS AND METHODS FOR GNSS INTERFERENCE MONITORING

(71) Applicant: Honeywell International Inc., Charlotte, NC (US)

(72) Inventors: Casey James Carlson, Minneapolis, MN (US); Karl Abraham Keyzer, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 333 days.

(21) Appl. No.: 18/479,682

(22) Filed: Oct. 2, 2023

(65) Prior Publication Data

US 2025/0110243 A1 Apr. 3, 2025

(51) Int. Cl.
G01S 19/21 (2010.01)

(52) U.S. Cl.
CPC .................................... G01S 19/21 (2013.01)

(58) Field of Classification Search
CPC ....................................................... G01S 19/21
See application file for complete search history.

(56) References Cited

U.S. PATENT DOCUMENTS

| | | | | |
|---|---|---|---|---|
| 5,701,328 | A | * | 12/1997 | Schuchman ............ G01S 19/21 |
| | | | | 375/139 |
| 9,297,904 | B2 | | 3/2016 | Scheitlin et al. |
| 10,648,814 | B2 | | 5/2020 | Hardt et al. |
| 2014/0152498 | A1 | | 6/2014 | Scheitlin et al. |

(Continued)

FOREIGN PATENT DOCUMENTS

| | | |
|---|---|---|
| CN | 111964688 B | 4/2022 |
| EP | 3964870 A1 | 3/2022 |
| WO | 2023281489 A1 | 1/2023 |

OTHER PUBLICATIONS

European Patent Office, "Extended European Search Report", dated Feb. 25, 2025, from EP Application No. 24199193.4, from Foreign Counterpart to U.S. Appl. No. 18/479,682, pp. 1 through 12, Published: EP.

(Continued)

*Primary Examiner* — Resha Desai
*Assistant Examiner* — Fred H Mull
(74) *Attorney, Agent, or Firm* — Fogg & Powers LLC

(57) ABSTRACT

Systems and methods for GNSS interference monitoring are provided. In certain embodiments, a system includes at least one GNSS receiver configured to receive a plurality of signals from a plurality of satellites and provide measurements from the plurality of satellites; and a processor coupled to the at least one GNSS receiver. Further, the processor is configured to calculate a detection parameter that comprises at least one of a composite detection parameter based on a short-term average and a long-term average of carrier-to-noise measurements for the plurality of signals; and a transient detection parameter based on an average difference for the plurality of satellites between the short-term average and long-term average of the carrier-to-noise measurements for each satellite in the plurality of satellites. The processor is also configured to determine a state of the plurality of signals based on a comparison of the composite detection parameter against a comparison threshold.

19 Claims, 5 Drawing Sheets

(56) References Cited

U.S. PATENT DOCUMENTS

2016/0047675 A1    2/2016  Tanenhaus et al.

OTHER PUBLICATIONS

Stader et al. "Leveraging Worldwide, Publicly-Available Data to Create an Automated Satnav Interference Detection System", ITM 2021—Proceedings of the 2021 International Technical meeting of the Institute of Navigation, The institute of Navigation, Jan. 28, 2021, pp. 69 through 83.

Valles et al., "Interference Detection algorithms for GNSS-enabled Android Devices", 2015—Proceedings of the 28th International Technical Meeting fo the Satellite Division of the Institute of Navigation (ION GNSS+ 2015). Sep. 18, 2015, pp. 317 through 324.

* cited by examiner

500

SYSTEMS AND METHODS FOR GNSS INTERFERENCE MONITORING

BACKGROUND

The Global Positioning System (GPS) is an example of a Global Navigation Satellite System (GNSS), often used to provide location information to other systems. With a GNSS, orbits of earth-orbiting radio-navigation satellites are arranged so that a designed number of satellites are always visible anywhere on the Earth. For example, four or more satellites are always visible with GPS. As such, a terrestrial or airborne GPS receiver can perform trilateration techniques using signals from four or more satellites to determine a precise position (e.g., altitude and latitudinal/longitudinal coordinates) of the receiver. Also, a GNSS receiver (or another computer using measurements from a GNSS receiver) can compute velocity and time using the received signals. Thus, GNSS receivers receive signals that enable the identification of precise position, velocity, and time information for users, including but not limited to aircraft, missiles, ships, ground-based vehicles, fixed-based systems, and individuals (e.g., using hand-held or body-mounted GNSS receivers).

A significant problem with existing GNSS receivers is that they are subject to jamming. Jamming is the intentional or unintentional denial of the signal to the user, typically through radio frequency interference (RFI). The original, direct GNSS signal can be overcome by noise from an RF jamming device or by the power of the indirect retransmitted signal itself. As such, jamming has been identified by the GNSS community as a threat to the ability of various systems to acquire navigation information.

SUMMARY

Systems and methods for GNSS interference monitoring are provided. In certain embodiments, a system includes at least one global navigation satellite system (GNSS) receiver configured to receive a plurality of signals from a plurality of satellites and provide measurements from the plurality of satellites. Further, the system includes at least one processor coupled to the at least one GNSS receiver. In some embodiments, the at least one processor is configured to calculate a detection parameter, wherein the detection parameter comprises at least one of a composite detection parameter based on a short-term average and a long-term average of carrier-to-noise measurements for the plurality of signals; and a transient detection parameter based on an average difference for the plurality of satellites between the short-term average and long-term average of the carrier-to-noise measurements for each satellite in the plurality of satellites. The at least one processor is also configured to determine a state of the plurality of signals based on a comparison of the composite detection parameter against a comparison threshold.

BRIEF DESCRIPTION OF DRAWINGS

Drawings accompany this description and depict only some embodiments associated with the scope of the appended claims. Thus, the described and depicted embodiments should not be considered limiting in scope. The accompanying drawings and specification describe exemplary embodiments, and features thereof, with additional specificity and detail, in which:

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and methods for GNSS interference monitoring are described herein. In certain embodiments, a system mounted to an object monitors signals from GNSS receivers to determine when the signals from a particular GNSS receiver are subject to interference. For example, the system may monitor carrier-to-noise (C/NO) measurements from the GNSS receivers to detect when the C/NO measurements drop below a certain level. With the C/NO measurements, the system calculates a parameter that compares a long-term filtered average and a short-term average of the received C/NO measurements. The system then uses calculated parameters to determine a state for the system and object. Based on the identified state, the system may provide pertinent data related to the state of the object.

Some vehicles or other moveable objects with a GNSS monitoring system mounted thereon may undergo maneuvers that can affect the ability of the system to accurately detect drops in C/NO measurements. For example, if the vehicle is an airplane, the airplane may undergo a pitch or roll that may cause a GNSS receiver to lose visibility of some GNSS satellites or receive signals from GNSS satellites at changed power levels. The change in GNSS satellite signal strength resulting from maneuvers may cause the system to falsely determine that the GNSS receiver is receiving interfering signals.

The system may avoid false determinations of interference by receiving inertial measurements or data from other sensors indicating whether the associated object is undergoing a maneuver. For example, inertial measurements of the motion of an airplane may indicate that the airplane is undergoing a roll maneuver that may cause the system to receive weaker GNSS signals. When the system receives and processes inertial measurements indicating that a maneuver is taking place, the system may suspend the detection of interfering signals while the object is undergoing the maneuver. By suspending the detection of interfering signals during object maneuvers, the system can more capably avoid potential false detections of interfering signals.

Figure 1:
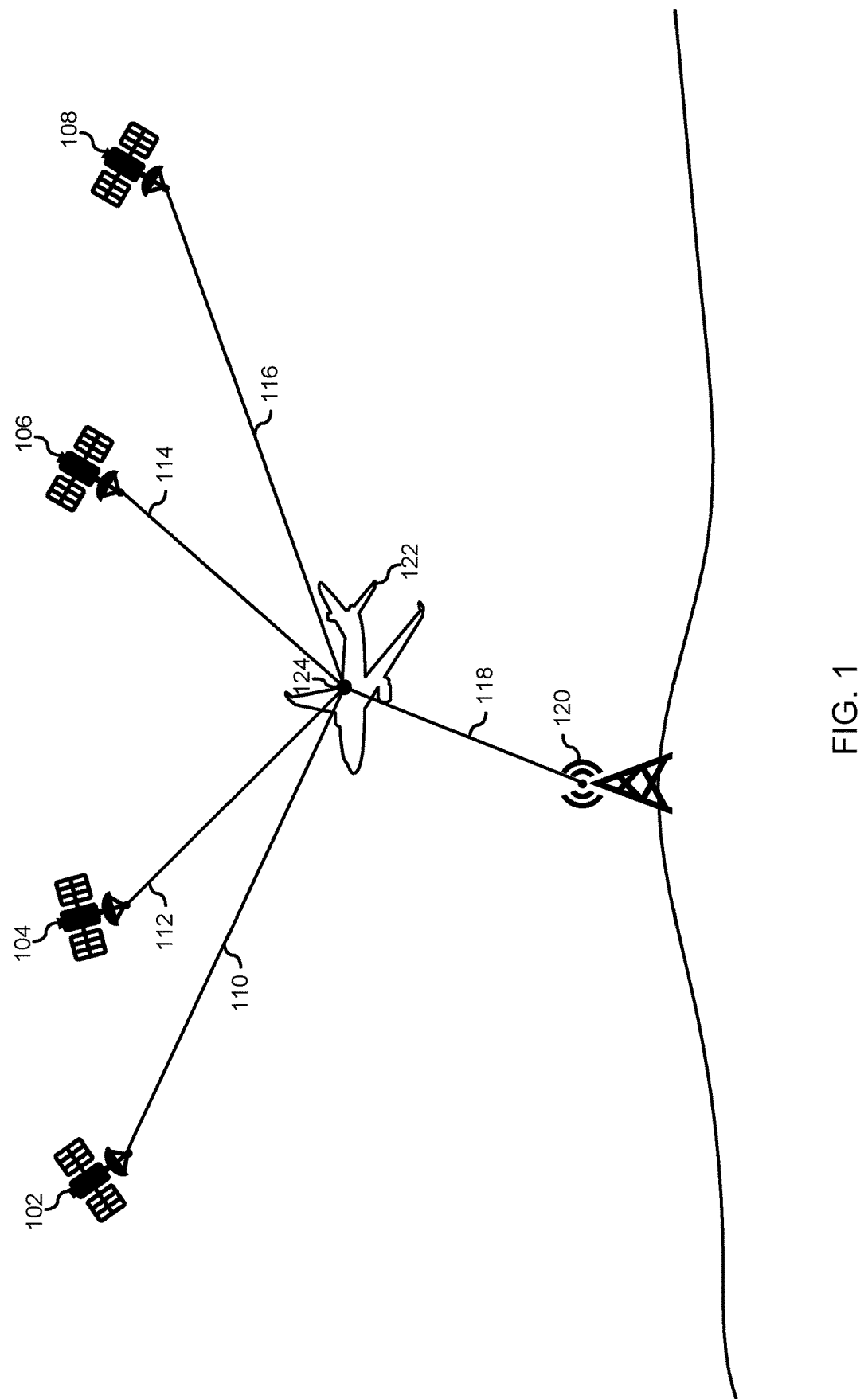
FIG. 1 is a pictorial representation illustrating the impact of interfering signals on transmitted GNSS signals.

With reference now to the figures, FIG. 1 illustrates a pictorial representation illustrating the impact of interfering signals on transmitted GNSS signals. As used herein, the GNSS signals may be any combination of signals from satellites that provide navigation signals according to any global navigation satellite system communication standard. For example, the GNSS satellites may be part of the global positioning system (GPS), GLONASS, Galileo system, COMPASS (BeiDou), or other systems of satellites forming a GNSS.

In some situations, a GNSS receiver 124 may receive signals from multiple GNSS satellites 102, 104, 106, and 108. For clarity, only four satellites are shown, but one having skill in the art would understand that, at any time, a GNSS receiver 124 may receive signals from more or less than the four satellites 102, 104, 106, and 108. Each satellite 102, 104, 106, and 108 includes a transmitter that transmits a respective navigation signal 110, 112, 114, and 116 received by the GNSS receiver 124. The GNSS receiver 124 may be in an airborne vehicle (such as an aircraft) 122. However, it should be understood that a GNSS receiver 124 can also be located in other types of vehicles, such as, for example, ships, ground-based vehicles (e.g., buses, trucks, automobiles, etc.), missiles, spacecraft, hand-held devices, and wearable devices. Also, for illustrative purposes and simplicity, the navigation signals 110, 112, 114, and 116 in FIG. 1 are shown as single signals. However, actual satellite navigation signals are typically encoded, complex multiple signals, but the navigation signals 110, 112, 114, and 116 are shown as single signals for simplicity when explaining principles described herein.

In some environments, the aircraft 122 may pass through an environment having one or more interfering signal sources 120. An interfering signal source 120 may emit an interfering signal 118 that interferes with the ability of the GNSS receiver 124 to receive at least one of the navigation signals 110, 112, 114, and 116. For example, the interfering signal source 120 may be a jamming signal source designed to emit noisy signals in a frequency range that overlaps with the frequencies of at least one of the navigation signals 110, 112, 114, and 116. The interfering signal 118 may increase the noise at the GNSS receiver 124, causing a decrease in the measured carrier-to-noise ratio of received navigation signals 110, 112, 114, and 116.

Systems described herein can detect the presence of an interfering signal 118 by detecting unexpected drops in carrier-to-noise ratios that would indicate the presence of an interfering signal 118. However, particular movements by a vehicle, like the aircraft 122, may cause drops in the carrier-to-noise ratios when an interference signal is not present. For example, the aircraft 122 may experience a pitch or roll that may cause structures of the aircraft 122 (like a wing or tail) to interfere with the reception of the navigation signals 110, 112, 114, and 116. Thus, drops in carrier-to-noise ratios caused by vehicle maneuvers may lead to false detections of interference. False detections of interference may lead a navigation system to avoid using GNSS navigation information or apply weights to the GNSS navigation information that reduce the effects of the GNSS navigation information on a resultant navigation solution, which can lead to navigation solutions that are inaccurate or less accurate than they would be when fully using the provided GNSS navigation information. To avoid false detections during vehicle maneuvers, systems described herein may suspend the detection of interfering signals during vehicle maneuvers.

Figure 2:
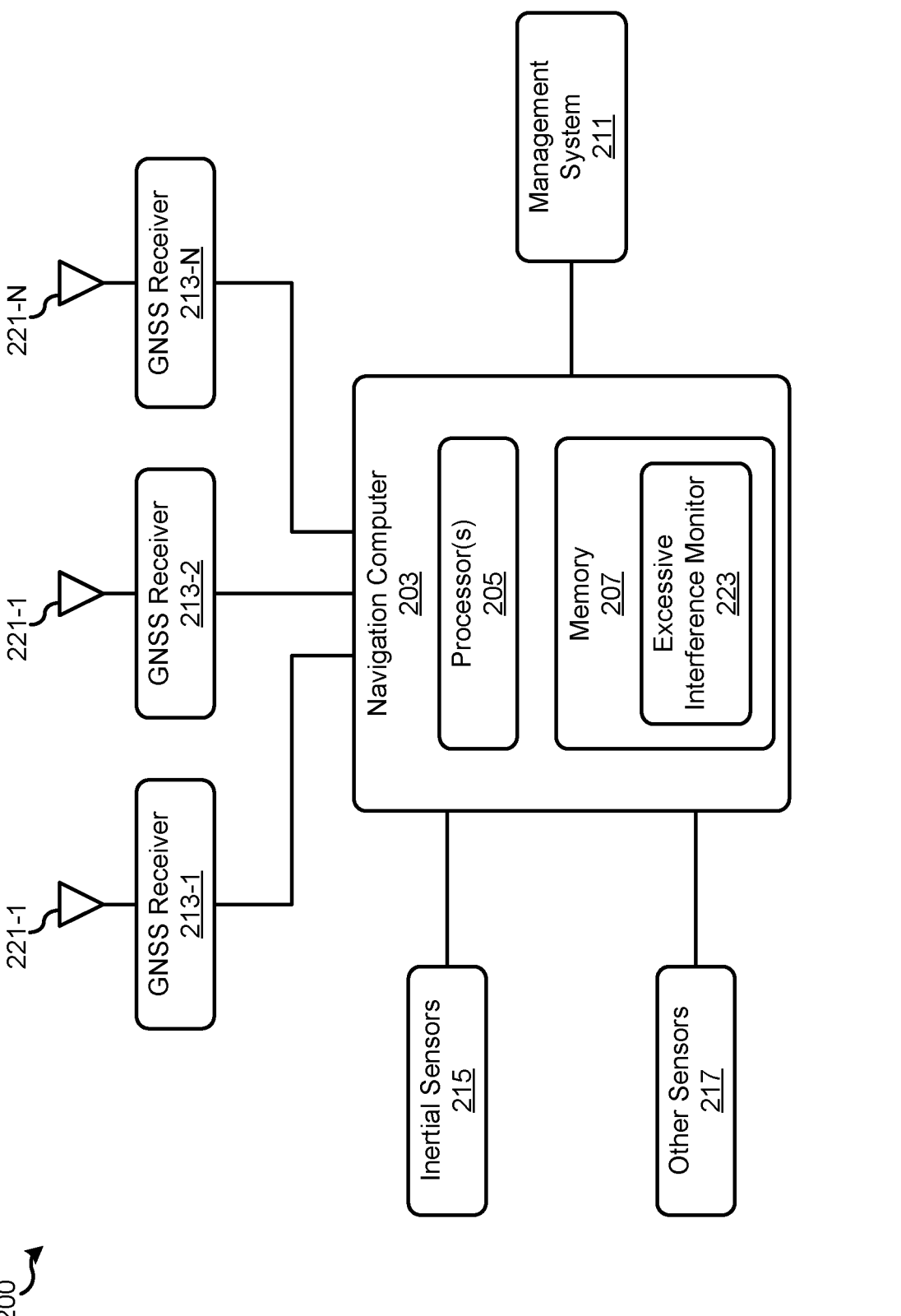
FIG. 2 is a block diagram of a system for detecting interfering signals while reducing false detections arising from vehicle maneuvers according to an aspect of the present disclosure.

FIG. 2 is a block diagram of a navigation system 200 for detecting interfering signals that reduces false detections arising from vehicle maneuvers. The navigation system 200 may be mounted to a moving object, such as the aircraft 122, or other objects like those described above. The navigation system 200 may acquire navigation information from one or more different sources. The navigation system 200 may include a navigation computer 203 to handle the acquired navigation information. The navigation computer 203 may further include one or more processors 205 and one or more memories 207. The navigation system 200 may also include or communicate with a management system 211. The management system 211 may be a system that controls or manages the operation of a vehicle.

In certain embodiments, the navigation system 200 may acquire navigation information that includes inertial motion information. To acquire the inertial motion information, the navigation system 200 may include inertial sensors 215 that measure and sense the inertial motion of the object mounted to the navigation system 200. For example, the navigation system 200 may be an inertial navigation system (INS) or an inertial reference unit (IRU) that receives raw inertial data from a combination of inertial sensors 215, such as gyroscopes and accelerometers. Alternatively, the inertial sensors 215 may be an INS that provides processed inertial navigation data acquired from inertial measurements to the navigation computer 203. In a further implementation, the inertial sensors 215 may provide either processed inertial navigation data or raw inertial data to GNSS receivers 213-1-213-N, where the GNSS receivers 213-1-213-N use the received inertial data to perform excessive interference detection calculations as described herein.

In further embodiments, the navigation system 200 may include several additional sensors that can provide navigation data. For example, the navigation system 200 may include one or more other sensors 217. For example, the one or more other sensors 217 may include a vertical position sensor such as an altimeter. Also, the one or more other sensors 217 may include electro-optical, magnetometers, barometric, velocimeters, and/or other types of sensors. The navigation system 200 may use data from the one or more other sensors 217 and the inertial sensors 215.

In certain embodiments, the navigation system 200 may use GNSS measurements to determine navigation information, and the navigation system 200 may include multiple GNSS receivers 213-1-213-N (hereinafter referred to generally and/or collectively as GNSS receiver(s) 213). Each GNSS receiver 213 is coupled to an associated antenna 221-1-221-N (hereinafter referred to generally and/or collectively as antenna(s) 221). The antennas 221 may be separate antennas or an array that uses beam-steering to acquire GNSS signals for the different GNSS receivers 213. Each GNSS receiver 213 may be coupled to receive satellite signals from multiple GNSS satellites that are observable through an associated antenna 221.

The processor 205 and/or other computational devices used in the navigation system 200, management system 211, or other systems and methods described herein may be implemented using software, firmware, hardware, or an appropriate combination thereof. The processor 205 and other computational devices may be supplemented by, or incorporated in, specially designed application-specific integrated circuits (ASICs) or field programmable gate arrays (FPGAs). In some implementations, the processor 205 and/or other computational devices may communicate through an additional transceiver with other computing devices outside of the navigation system 200, such as those associated with the management system 211 or computing devices associated with other subsystems controlled by the management system 211. The processor 205 and other computational devices may also include or function with software programs, firmware, or other computer-readable instructions for various process tasks, calculations, and control functions in the methods and systems described herein.

The methods described herein may be implemented by computer-executable instructions, such as program modules or components, executed by at least one processor, such as the processor 205. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products, including computer-readable media used to store computer-readable instructions or data structures. Such a computer-readable medium may be available media that a general-purpose computer, special-purpose computer, or any programmable logic device can access. For instance, the memory 207 may be an example of a computer-readable medium capable of storing computer-readable instructions and/or data structures. Also, the memory 207 may store navigational information such as maps, terrain databases, magnetic field information, path data, and other navigation information.

Suitable computer-readable storage media (such as the memory 207) may include, for example, non-volatile memory devices, including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

As described above, each GNSS receiver 213 may receive signals from different satellites through the associated antenna 221. As such, the different GNSS receivers 213 may also receive interfering signals that can interfere with the ability of the navigation system 200 to acquire accurate GNSS measurements from the GNSS receivers 213. To help the system 200 determine whether the GNSS receivers 213 are receiving interfering signals, each GNSS receiver 213 may provide different measurements associated with each satellite signal that the navigation computer 203 can use to determine whether the GNSS receiver 213 is receiving an interfering signal. For example, each GNSS receiver 213 may provide a C/NO value and a current time measurement. The navigation computer 203 may use the current time measurement to determine the position of the associated object and the C/NO value to determine whether an interfering signal is impeding the ability to accurately receive measurements from a particular GNSS satellite.

Further, as vehicle or object maneuvers may also interfere with the ability of the navigation computer 203, the navigation computer 203 may also receive the inertial measurements from the inertial sensors 215 and navigation information from the one or more other sensors 217 to determine whether the object is performing a maneuver. When the navigation computer 203 determines that the object is performing a maneuver, the navigation computer 203 may suspend determining whether a particular GNSS receiver 213 is receiving interfering signals.

As shown in FIG. 2, the memory 207 stores executable code that, when executed by the processor 205, causes the processor 205 to function as an excessive interference monitor 223. For example, when functioning as an excessive interference monitor 223, the processor 205 monitors the signals provided by each GNSS receiver 213 for excessive interference. In particular, the processor 205 may execute a separate excessive interference monitor 223 for each GNSS receiver 213. While the excessive interference monitor 223 is shown as being code executed by the processor 205, the excessive interference monitor 223 may also be a series of dedicated interference monitoring devices, having software and hardware, that separately monitor signals from an associated GNSS satellite for interference.

Figure 3:
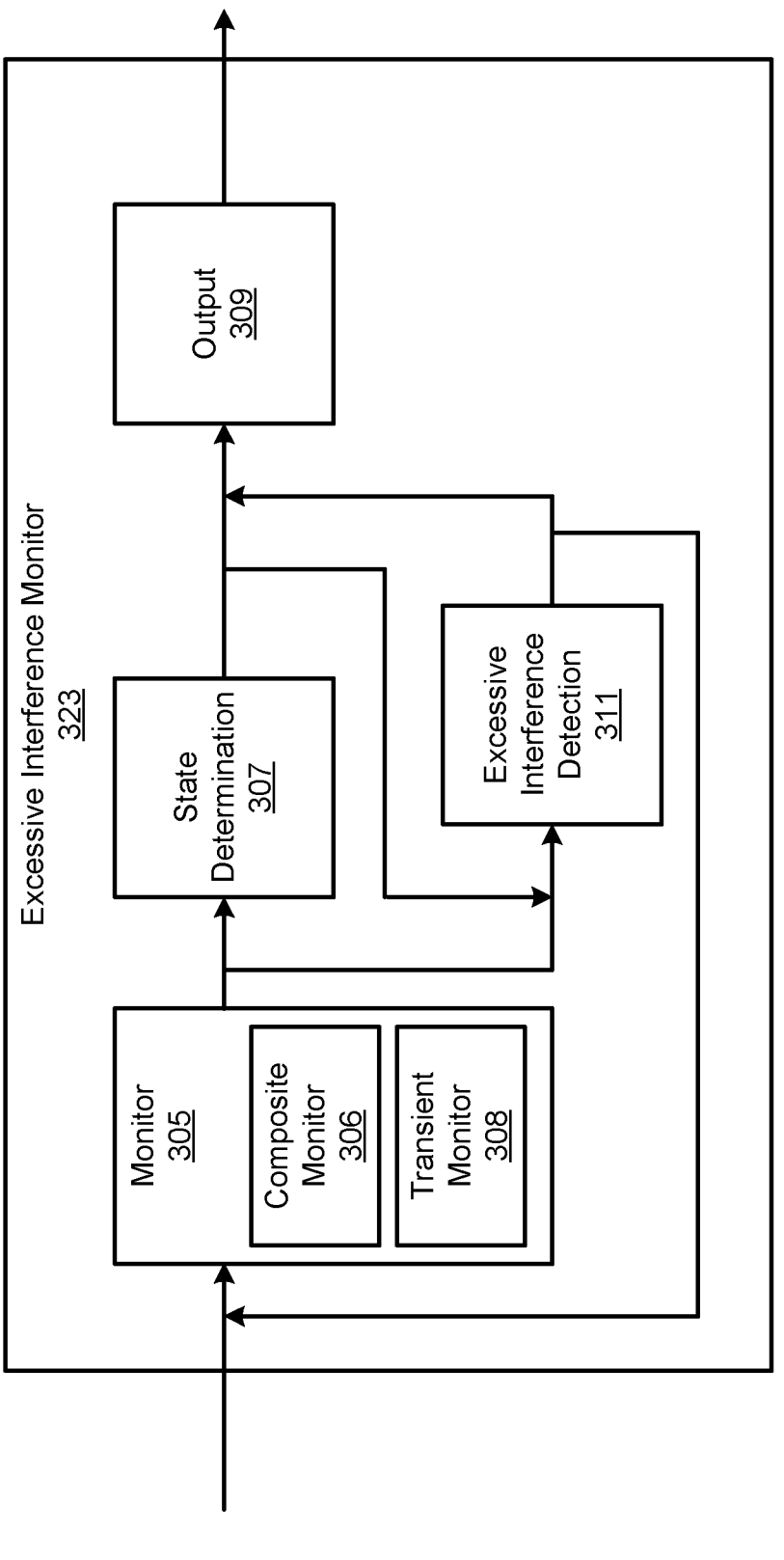
FIG. 3 is a block diagram illustrating an excessive interference monitor according to an aspect of the present disclosure.

FIG. 3 is a block diagram illustrating the functionality of an exemplary excessive interference monitor 323, which excessive interference monitor 323 is a detailed implementation of the excessive interference monitor 223 in FIG. 2. As described above, the excessive interference monitor 323 receives GPS data and inertial reference data. Also, the excessive interference monitor 323 may be implemented within a GNSS receiver, an inertial navigation system, a navigation computer, or other computational device. As described, the GPS data may include C/NO measurements received from one of the GNSS receivers 213. In some implementations, the C/NO measurements are adjusted based on expected values as a function of elevation angles for the satellites providing signals to the GNSS receiver. The inertial reference data may include inertial measurements produced by the inertial sensors 215 or other navigational measurements produced by the one or more other sensors 217. The excessive interference monitor 323 uses the inertial reference data 303 to determine whether an object is experiencing a maneuver.

As mentioned above, the excessive interference monitor 323 can monitor signals from a GNSS receiver for excessive interference. The excessive interference monitor 323 may perform various internal algorithms to monitor for excessive interference. The three internal algorithms or sections may include a monitor section 305, a state determination section 307, an excessive interference detection 311, and an output section 309. The monitor section 305 (or monitor 305) receives the GPS data and the inertial reference data as inputs and performs several calculations that are then passed to the state determination section 307 and the excessive interference detection 311. The state determination section 307 (or state determination 307) uses the output of the monitor 305 to identify a state for the excessive interference monitor 323. The state determination 307 then provides the state to the excessive interference detection 311 and the output section 309. Further, the excessive interference detection 311 uses the calculations from the composite monitor and the identified state from the state determination 307 to detect whether the received GNSS signals are affected by excessive interference. The output section 309 (or output 309), may receive the determined state from the state determination 307 and the result of the interference detection from the excessive interference detection 311. The output section 309 may provide the output data for other systems in formats that are useful for the other systems. Additionally, the excessive interference detection 311 may feedback information regarding the interference detection to the monitor 305.

In exemplary embodiments, the monitor 305 determines whether the object associated with the navigation system 200 is experiencing a maneuver. For example, the monitor 305 may use the inertial reference data 303 to determine if the object is performing a maneuver. If the monitor 305 determines that the object is performing a maneuver, the monitor 305 may suspend the performance of interference monitoring until the object completes the performance of the maneuver.

In certain embodiments, the monitor 305 makes the calculations used to determine the state of the excessive interference monitor 323 and the output for the excessive interference monitor 323. As part of performing the calculations, the excessive interference monitor 323 determines whether the excessive interference monitor 323 has received a specific number of GPS measurements for performing the calculations of the monitor 305. In some implementations, when determining whether the excessive interference monitor 323 has received a specific number of GPS measurements, the monitor 305 determines whether the excessive interference monitor 323 has received GNSS measurements from less than a threshold number of GNSS satellites. If the received number of GNSS measurements is less than the threshold number, the monitor 305 increments a missing measurement counter. However, if the received number of GNSS measurements is greater than or equal to the threshold number, the monitor 305 resets the missing measurement counter to zero. Further, when incrementing the missing measurement counter causes the counter to exceed a threshold value, the monitor 305 determines that there has been a significant signal loss. In other implementations, when determining whether the excessive interference monitor 323 has received at least a specified number of GPS measurements, if the excessive interference monitor 323 has received at least the specified number of GPS measurements, the monitor 305 may initialize a missing measurement timer. If the missing measurement timer exceeds a threshold value, the monitor 305 determines that there has been a significant signal loss. A determination of significant signal loss indicates either the presence of a GNSS interference signal or that a system has not received enough GNSS measurements to determine the position of the system.

In additional embodiments, when the monitor 305 determines that a system has received a sufficient number of GNSS measurements, the monitor 305 may include a composite monitor 306 and a transient monitor 308 which compute interference parameters that are used by the state determination 307 to determine whether the state of signals received by a GNSS receiver 213. As mentioned above, when the object associated with the navigation system 200 is experiencing a maneuver, the monitor 305 suspends the computation of the interference parameter.

When calculating one example of an interference parameter, the composite monitor 306 may calculate a composite detection measure $D_{comp}$ using the following equation:

$$D_{comp} = X_{avg} - Y_{avg}.$$

As shown in the equation, $X_{avg}$ represents a current average of the received C/NO measurements and $Y_{avg}$ represents a long-term average of the received C/NO measurements. For example, the current average is an average of the N most recent C/NO measurements, and the long-term average is an average of the M most recent C/NO measurements, where M is greater than N and, in certain implementations, much greater than N. As discussed above, when experiencing a maneuver, the composite monitor 306 does not update the $X_{avg}$ and Yang when the object is experiencing a maneuver.

In some embodiments, the $Y_{avg}$ may be a filtered average that is calculated using the following equation:

$$Y_i = (1 - 1/\tau) * Y_{i-1} + (1/\tau) * X.$$

As shown, the current long-term filtered average $Y_i$ is equal to one minus the reciprocal of a time constant t multiplied by the most recently calculated long-term filtered average with the addition of the reciprocal of the time constant multiplied by the most recently received C/NO measurement from the GNSS receiver 213. In some implementations, the current average $X_{avg}$ may also be calculated as a filtered average. However, when the current average is calculated as a filtered average, the filtered average may be calculated using the same equation used to calculate the long-term filtered average. For example, when the current average is a filtered average, the current average is calculated with a shorter time constant (~10 seconds), and the long-term filtered average is calculated with a longer time constant (~200 seconds).

In some embodiments, spurious C/NO measurements can negatively affect the short-term and long-term filtered averages. In particular, if a C/NO measurement is weaker than the rest of the received signals, the composite monitor 306 may exclude the weaker measurement from the calculation. For example, the weakest measurement within a timeframe may be excluded. Also, the composite monitor 306 may exclude measurements that are a certain number of standard deviations from the average calculated over a recent timeframe. Thus, the effects of outlier measurements not representative of excessive interference may also be excluded.

In further embodiments, the monitor 305 may also include a transient monitor 308 that calculates a transient parameter in addition to the composite detection measure. To calculate the transient detection measure, the transient monitor 308 may detect changes in C/NO values on a per-satellite basis by filtering the C/NO measurements using a medium time constant and a short time constant. Then, the transient monitor 308 calculates the difference between the medium and short time constants and takes the average across all the available satellite measurements. For example, the transient detection measure can be calculated as the following:

$$D_{Tr} = \sum_{Valid\ Meas} Z(id)/numMeas.$$

In the above equation, the numMeas is the number of satellites providing valid measurements, and Z(id) is the difference between the fast and medium time constant filtered averages for the C/NO measurements from a particular satellite. For example, Z(id) is equal to the following:

$$Z(id) = Y_{fast}(id) - Y_{medium}(id),$$

where $Y_{fast}$ and $Y_{medium}$ are equal to the following:

$$Y_{fast}(id) = Filter(X(id), \tau_{fast}),$$

and $$Y_{medium}(id) = Filter(X(id), \tau_{medium}).$$

X(id) is a C/NO measurement for a particular satellite. The monitor 305 may then provide the $D_{Tr}$ and $D_{comp}$ as outputs. In additional embodiments, the $D_{Tr}$ may be calculated using the following equation:

$$D_{Tr} = \sum\nolimits_{Valid\ Meas} |Z(id)|/numMeas.$$

Accordingly, the transient detection measure may be calculated based on the magnitude of the Z(id), thus the transient monitor 308 may calculate the average change in value, accounting for both increases and decreases in the C/NO measurements.

In certain embodiments, the monitor 305 may provide the detection measures to the state determination 307. As stated above, the state determination 307 may determine the state of the GNSS signals received by a particular GNSS receiver 213 based on the received detection measures. In addition, the monitor 305 may provide indications of the significant signal loss and the number of available measurements. In particular, the state determination 307 may determine whether the received GNSS signals are in a normal-power, high-power, or low-power state.

In exemplary embodiments, the state determination 307 determines whether the received GNSS signals are in the normal-power, high-power, or low-power state based on comparing the composite detection measure against various thresholds. For example, if the composite detection measure becomes less than a low-power threshold, the state determination 307 changes the state from a normal-power state to a low-power state. Further, if the composite detection measure moves from a value less than the low-power threshold to a value greater than the low-power threshold, the state determination 307 changes the state from a low-power state to a normal-power state. Also, if the composite detection measure becomes greater than a high-power threshold, the state determination 307 changes the state from a normal-power state to a high-power state. Further, if the composite detection measure moves from a value less than the high-power threshold to a value lower than the high-power threshold, the state determination 307 changes the state from a high-power state to a normal-power state.

Additionally, the state determination 307 may include additional logic to improve performance when the state of the received GNSS signals transitions between the normal-power state and one of the high-power and low-power state. For example, the additional logic may prevent the state determination 307 from oscillating between the normal-power state and one of the high-power and low-power state. Further, the state determination 307 may compare the transient detection measure against the low-power and high-power thresholds, in addition to the comparison of the composite detection measure against the low-power and high-power thresholds.

In some embodiments, the state determination 307 provides the determination to the excessive interference detection 311. Also, the monitor 305 provides the detection measures to the excessive interference detection 311. The excessive interference detection 311 may use the determination and the detection measures to determine whether a GNSS receiver is receiving interfering signals. The excessive interference detection 311 may provide the detection to the output 309 and as feedback to the monitor 305. The monitor 305 may provide various measurements in response to the detection of interfering signals.

When the state determination 307 has determined the state of the received GNSS signals, the state determination 307 also provides the determination to the output 309. In addition, the excessive interference detection 311 may provide detections of excessive interference to the output 309. The output 309 then provides received data for use by another system or algorithm. For example, the output 309 may provide an indication of excessive interference and an indication of the state of the GNSS measurements. The output 309 may allow the receiving system or algorithm to determine whether to use GNSS measurements or limit the effects of the GNSS measurements on subsequent calculations of the navigation solution for the vehicle.

Figure 4:
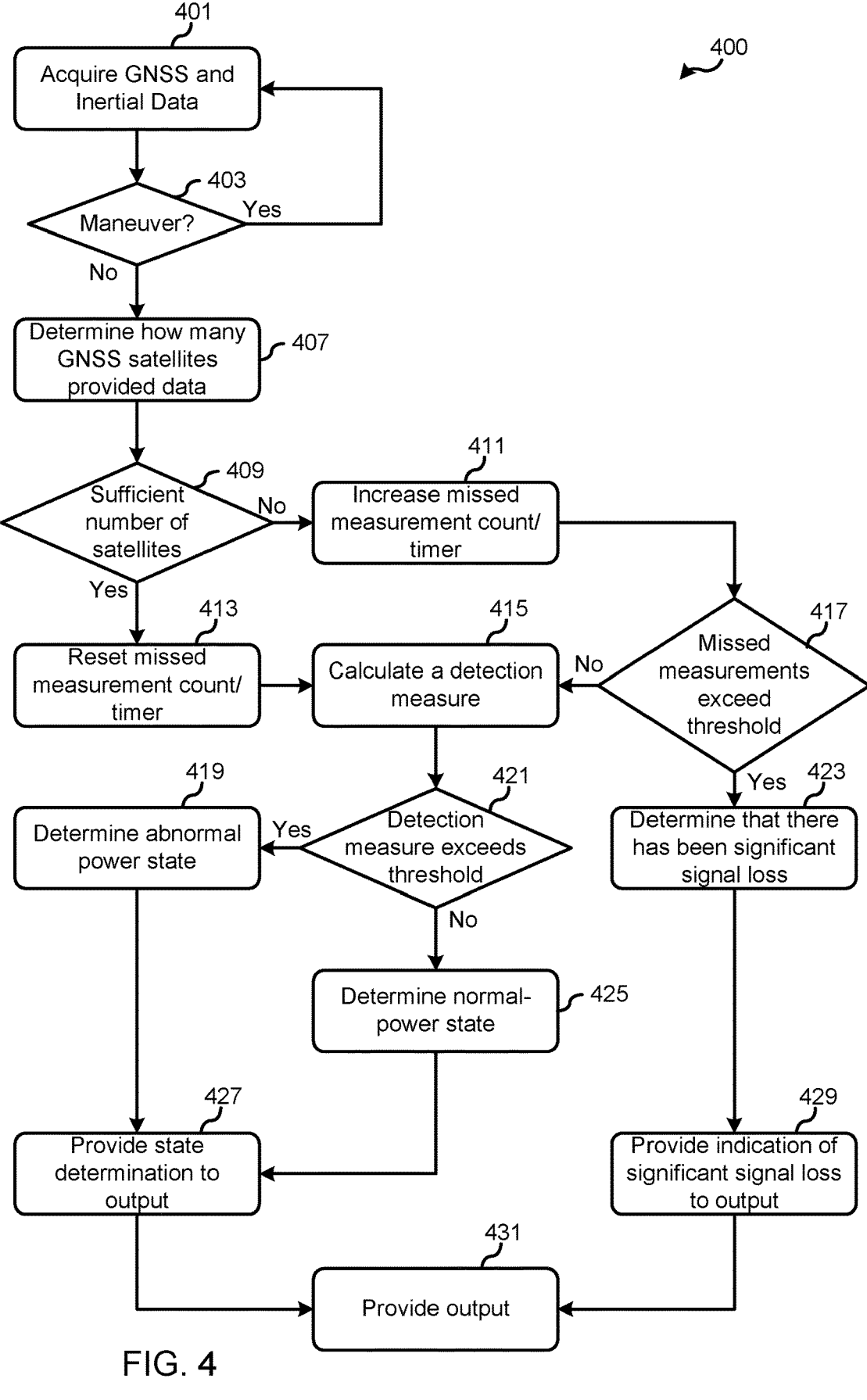
FIG. 4 is a flowchart diagram of a method for detecting interfering signals while reducing false detections arising from vehicle maneuvers according to an aspect of the present disclosure.

FIG. 4 is a flow diagram illustrating an exemplary method 400 for performing some of the functions ascribed above to the excessive interference monitor 323. In particular, the method 400 provides the flow for the monitor 305, state determination 307, and output 309. The method 400 proceeds at 401, where GNSS data and inertial data are acquired. For example, a GNSS receiver and inertial sensors may provide measurement data to a processor performing the functions of the excessive interference monitor 323. With the received data, the method 400 proceeds at 403, where it is determined whether an object associated with received inertial data is performing a maneuver. If it is determined that the object is performing a maneuver, the method 400 returns to 401 for receiving additional GNSS and inertial data. The reception of additional GNSS and inertial data in response to determining that the object is undergoing a maneuver may have the effect of suspending operation of the excessive interference monitor 323. When operation is suspended, the method 400 cycles through receiving additional GNSS and inertial data at 401 and checking whether the additional GNSS and inertial data indicates that the object is still performing a maneuver at 403. The method 400 repeatedly cycles through 401 and 403 until the additional GNSS and inertial data indicate that the object has completed the maneuver.

When the received GNSS and inertial data or additional GNSS inertial data indicates that the object is not experiencing a maneuver, the method 400 proceeds at 407, where how many GNSS satellites are providing data is determined. For example, the excessive interference monitor 323 may analyze the received GNSS data to determine how many satellites provided signals received by a specific GNSS receiver. When the method determines how many GNSS satellites provide data, the method 400 proceeds at 409, where the method determines whether a GNSS receiver has received measurements from a sufficient number of satellites. When the method 400 determines that a GNSS receiver has not received a sufficient number of satellites, the method 400 proceeds at 411, where a missed measurement count is incremented or a missed measurement timer is allowed to run. After incrementing the missed measurement count or allowing the missed measurement timer to run, the method 400 proceeds at 417 to determine whether the missed measurement count/timer exceeds a missed measurement threshold. If the missed measurement count exceeds a missed measurement count threshold or the missed measurement timer is longer than a missed measurement timing threshold, the method 400 proceeds at 423, where it is determined that there has been a significant signal loss. Returning to 409, where the method 400 determines whether measurements have been received from a sufficient number of satellites, if measurements have been received from a sufficient number of satellites, the method 400 proceeds at 413, where the missed measurement count/timer is reset.

In certain embodiments, when the missed measurement count/timer is reset at 413, or the missed measurement count is determined to be less than the missed measurement threshold at 417, the method 400 then proceeds at 415, where a detection measure is calculated. For example, the excessive interference monitor 323 may calculate a composite detection measure as described above. In some implementations, the excessive interference monitor 323 may also calculate a transient detection measure as described above. When the detection measure is calculated, the method 400 proceeds at 421, where the detection measure is compared against one or more thresholds. If the detection measure exceeds the one or more thresholds, then the measure proceeds at 425, where it is determined that the system is in a normal-power state with respect to the reception of GNSS signals. However, if the detection measure exceeds the one or more thresholds, then the measure proceeds at 419, where it is determined that the system is in either a low-power or high-power state with respect to the reception of GNSS signals based on a comparison to a low-power or high-power threshold.

In further embodiments, when the method has determined that the system is in a low, high, or normal-power state with respect to the reception of GNSS signals, the method proceeds at 427, where a state determination is provided to the output. In addition to providing the state determination to the output, when the method 400 proceeds from 423 to 429, the method 400 provides the indication of significant signal loss to the output. With the state determination and possible indication of significant signal loss provided to the output, the method 400 proceeds at 431, where an output is provided to an external system or algorithm. For example, the method 400 may provide the state determination and the conditionally generated indication of significant signal loss to a connected system or as an input to an additional algorithm. Further, the method 400 may provide any other data used or calculated as part of the output for use by the connected system or additional algorithm.

Figure 5:
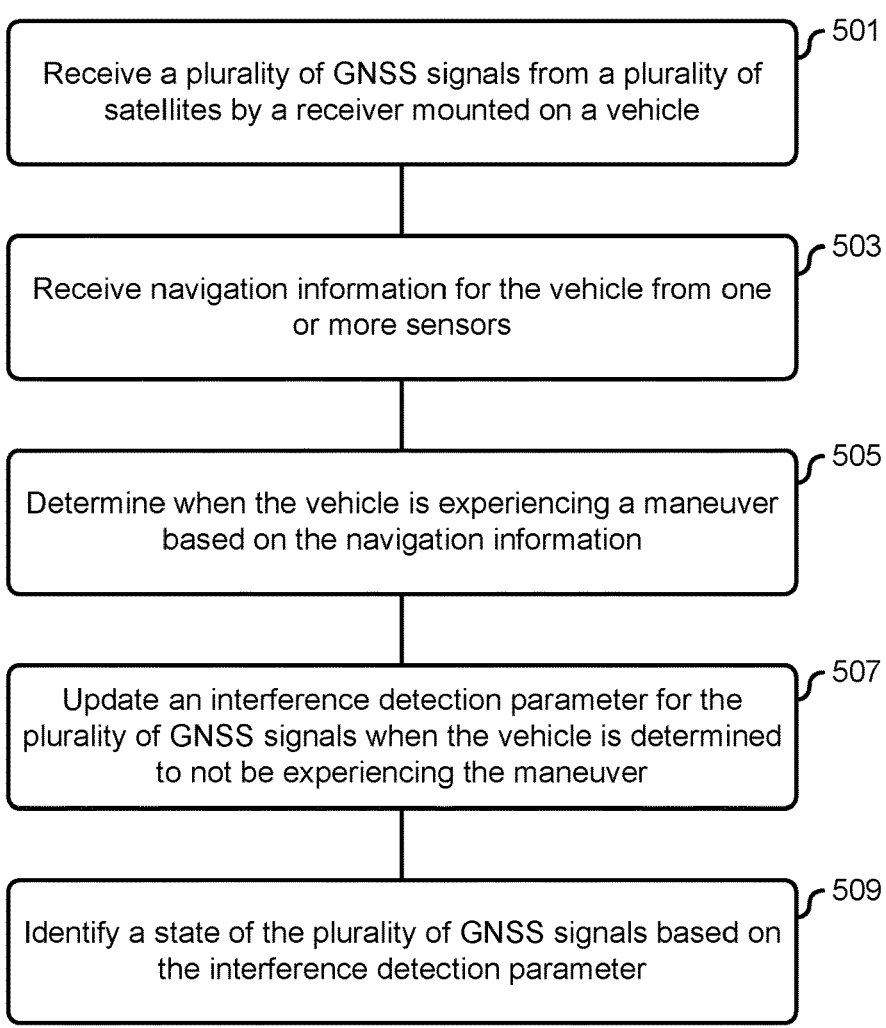
FIG. 5 is a flowchart diagram of a method for detecting interfering signals while reducing false detections arising from vehicle maneuvers according to an aspect of the present disclosure.

FIG. 5 is a flowchart diagram of a method 500 for detecting interfering signals while reducing false detections arising from vehicle maneuvers. In certain embodiments, the method 500 proceeds at 501, where a plurality of GNSS signals are received from a plurality of satellites by a receiver mounted on a vehicle. Additionally, the method 500 proceeds at 503, where navigation information is received for the vehicle from one or more sensors. Also, the method 500 proceeds at 505, where it is determined when the vehicle is experiencing a maneuver based on the navigation information. Further, the method 500 proceeds at 507, where an interference detection parameter is updated from the plurality of GNSS signals when the vehicle is determined to not be experiencing the maneuver. Moreover, the method 500 proceeds at 509, where a state of the plurality of GNSS signals is identified based on the interference detection parameter. Using the identified state, a navigation system may be aware of whether received GNSS signals are affected by interference.

Example Embodiments

Example 1 includes a system comprising: at least one global navigation satellite system (GNSS) receiver configured to receive a plurality of signals from a plurality of satellites and provide measurements from the plurality of satellites; and at least one processor coupled to the at least one GNSS receiver, wherein the at least one processor is configured to: calculate a detection parameter, wherein the detection parameter comprises at least one of: a composite detection parameter based on a short-term average and a long-term average of carrier-to-noise measurements for the plurality of signals; and a transient detection parameter based on an average difference for the plurality of satellites between the short-term average and long-term average of the carrier-to-noise measurements for each satellite in the plurality of satellites; determine a state of the plurality of signals based on a comparison of the composite detection parameter against a comparison threshold.

Example 2 includes the system of Example 1, further comprising one or more motion sensors configured to provide motion measurements of an object to the at least one processor; wherein the at least one processor is further configured to: determine whether the object is experiencing a maneuver based on the motion measurements received from the one or more motion sensors; and suspend the calculation of detection parameter and determination of the state when the motion measurements indicate that the object is experiencing the maneuver.

Example 3 includes the system of any of Examples 1-2, wherein the at least one processor is configured to detect whether the at least one GNSS receiver is experiencing significant signal loss based on a number of available satellite measurements received by the at least one GNSS receiver.

Example 4 includes the system of any of Examples 1-3, wherein the long-term average is a filtered average of the carrier-to-noise measurements calculated using a time constant.

Example 5 includes the system of any of Examples 1-4, wherein the short-term average is an average of a number of most recently received carrier-to-noise measurements.

Example 6 includes the system of any of Examples 1-5, wherein the short-term average is a filtered average of the carrier-to-noise measurements calculated using a short-term time constant that is shorter than a long-term time constant used to calculate the long-term average.

Example 7 includes the system of any of Examples 1-6, wherein the at least one processor is configured to exclude carrier-to-noise measurement outliers when calculating at least one of the long-term average and the short-term average.

Example 8 includes the system of any of Examples 1-7, wherein the at least one processor is configured to determine whether the plurality of signals from the at least one GNSS receiver is in a low-power state, a high-power state, or a normal-power state.

Example 9 includes the system of Example 8, wherein the at least one processor executes logic for controlling at least one of transitions between the low-power state and the normal-power state and transitions between the high-power state and the normal-power state.

Example 10 includes the system of any of Examples 1-9, wherein the carrier-to-noise measurements are adjusted based on expected values as a function of satellite elevation angle.

Example 11 includes the system of any of Examples 1-10, wherein the at least one processor provides the state of the plurality of signals as an output to a connected system.

Example 12 includes a method comprising: receiving a plurality of global navigation satellite system (GNSS) signals from a plurality of satellites by a receiver mounted on a vehicle; receiving navigation information for the vehicle from one or more sensors; determining when the vehicle is experiencing a maneuver based on the navigation information; updating an interference detection parameter for the plurality of GNSS signals when the vehicle is determined to not be experiencing the maneuver; and identifying a state of the plurality of GNSS signals based on the interference detection parameter.

Example 13 includes the method of Example 12, wherein the interference detection parameter is updated based on a difference between a short-term average and a long-term average of carrier-to-noise measurements for the plurality of GNSS signals.

Example 14 includes the method of Example 13, wherein the long-term average is a filtered average of the carrier-to-noise measurements calculated using a time constant.

Example 15 includes the method of any of Examples 13-14, wherein the short-term average is an average of a number of most recently received carrier-to-noise measurements.

Example 16 includes the method of Example 15, wherein the short-term average is a filtered average of the carrier-to-noise measurements calculated using a short-term time constant that is shorter than a long-term time constant used to calculate the long-term average.

Example 17 includes the method of any of Examples 13-16, wherein updating the interference detection parameter further comprises calculating a transient detection measure.

Example 18 includes the method of any of Examples 12-17, further comprising detecting significant signal loss based on a number of available satellite measurements.

Example 19 includes the method of any of Examples 12-18, wherein identifying the state of the plurality of GNSS signals comprises determining whether the plurality of GNSS signals is in a low-power state, a high-power state, or a normal-power state.

Example 20 includes a system comprising: at least one global navigation satellite system receiver mounted on a vehicle configured to receive a plurality of signals from a plurality of satellites; one or more sensors that provide navigation information for the vehicle; and a processing unit coupled to the at least one global navigation satellite system receiver and the one or more sensors, wherein the processing unit executes an excessive interference monitor that comprises: a composite monitor section that updates a composite detection parameter based on a short-term average and a long-term average of carrier-to-noise measurements for the plurality of signals, wherein the composite monitor section suspends updating the composite detection parameter in response to a determination that the vehicle is experiencing a maneuver based on the navigation information; a state determination section that determines a state of the plurality of signals based on a comparison of the composite detection parameter received from the composite monitor section; and an output section that provides information related to the state of the plurality of signals for use by the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   at least one global navigation satellite system (GNSS) receiver configured to receive one or more signals from a plurality of satellites and provide carrier-to-noise measurements for the one or more signals; and at least one processor coupled to the at least one GNSS receiver, wherein the at least one processor is configured to:
   calculate a detection parameter, wherein the detection parameter comprises at least one of:
      a composite detection parameter based on a difference between a short-term average of the carrier-to-noise measurements for the one or more signals and a long-term average of the carrier-to-noise measurements for the one or more signals; and
      a transient detection parameter based on an average difference for the plurality of satellites being an average of respective differences between a short-term average of the carrier-to-noise measurements for each respective satellite in the plurality of satellites and a long-term average of the carrier-to-noise measurements for each respective satellite in the plurality of satellites; and
   determine a state of the one or more signals based on a comparison of the detection parameter against a comparison threshold.

2. The system of claim 1, further comprising one or more motion sensors configured to provide motion measurements of an object to the at least one processor;
   wherein the at least one processor is further configured to:
      determine whether the object is experiencing a maneuver based on the motion measurements received from the one or more motion sensors; and
      suspend the calculation of the detection parameter and determination of the state when the motion measurements indicate that the object is experiencing the maneuver.

3. The system of claim 1, wherein the at least one processor is configured to detect whether the at least one GNSS receiver is experiencing significant signal loss based on a number of available satellite measurements received by the at least one GNSS receiver.

4. The system of claim 1, wherein the long-term average is a filtered average of the carrier-to-noise measurements calculated using a time constant.

5. The system of claim 1, wherein the short-term average is an average of a number of most recently received carrier-to-noise measurements.

6. The system of claim 1, wherein the short-term average is a filtered average of the carrier-to-noise measurements calculated using a short-term time constant that is shorter than a long-term time constant used to calculate the long-term average.

7. The system of claim 1, wherein the at least one processor is configured to exclude carrier-to-noise measurement outliers when calculating at least one of the long-term average and the short-term average.

8. The system of claim 1, wherein the at least one processor is configured to determine whether the one or more signals from the at least one GNSS receiver is in a low-power state, a high-power state, or a normal-power state.

9. The system of claim 8, wherein the at least one processor executes logic for controlling at least one of transitions between the low-power state and the normal-power state and transitions between the high-power state and the normal-power state.

10. The system of claim 1, wherein the carrier-to-noise measurements are adjusted based on expected values as a function of satellite elevation angle.

11. The system of claim 1, wherein the at least one processor provides the state of the one or more signals as an output to a connected system.

12. A method comprising:

receiving one or more global navigation satellite system (GNSS) signals from a plurality of satellites and carrier-to-noise measurements for the one or more GNSS signals by a receiver mounted on a vehicle;

receiving navigation information for the vehicle from one or more sensors;

determining when the vehicle is experiencing a maneuver based on the navigation information;

updating an interference detection parameter for the one or more GNSS signals when the vehicle is determined to not be experiencing the maneuver; and identifying a state of the one or more GNSS signals based on the interference detection parameter, comprising:

updating the interference detection parameter based on a difference between a short-term average and a long-term average of the carrier-to-noise measurements for the one or more GNSS signals; and comparing the interference detection parameter against at least one of a low power threshold and a high power threshold.

13. The method of claim 12, wherein the long-term average is a filtered average of the carrier-to-noise measurements calculated using a time constant.

14. The method of claim 12, wherein the short-term average is an average of a number of most recently received carrier-to-noise measurements.

15. The method of claim 14, wherein the short-term average is a filtered average of the carrier-to-noise measurements calculated using a short-term time constant that is shorter than a long-term time constant used to calculate the long-term average.

16. The method of claim 12, wherein updating the interference detection parameter further comprises calculating a transient detection measure.

17. The method of claim 12, further comprising detecting significant signal loss based on a number of available satellite measurements.

18. The method of claim 12, wherein identifying the state of the one or more GNSS signals comprises determining whether the one or more GNSS signals is in a low-power state, a high-power state, or a normal-power state.

19. A system comprising:

at least one global navigation satellite system receiver mounted on a vehicle configured to receive one or more signals from a plurality of satellites and provide carrier-to-noise measurements for the one or more signals;

one or more sensors that provide navigation information for the vehicle; and a hardware processor coupled to the at least one global navigation satellite system receiver and the one or more sensors, wherein the hardware processor executes an excessive interference monitor that comprises:

a composite monitor section that updates a composite detection parameter based on a difference between a short-term average of the carrier-to-noise measurements for the one or more signals and a long-term average of the carrier-to-noise measurements for the one or more signals, wherein the composite monitor section suspends updating the composite detection parameter in response to a determination that the vehicle is experiencing a maneuver based on the navigation information;

a state determination section that determines a state of the one or more signals based on a comparison of the composite detection parameter received from the composite monitor section against at least one of a low-power threshold and a high-power threshold; and an output section that provides information related to the state of the one or more signals for use by the vehicle.

* * * * *